Aug. 7, 1956 G. E. HELM 2,757,899
WATER WAVE OPERATED POWER MECHANISM
Filed June 7, 1954 5 Sheets-Sheet 4
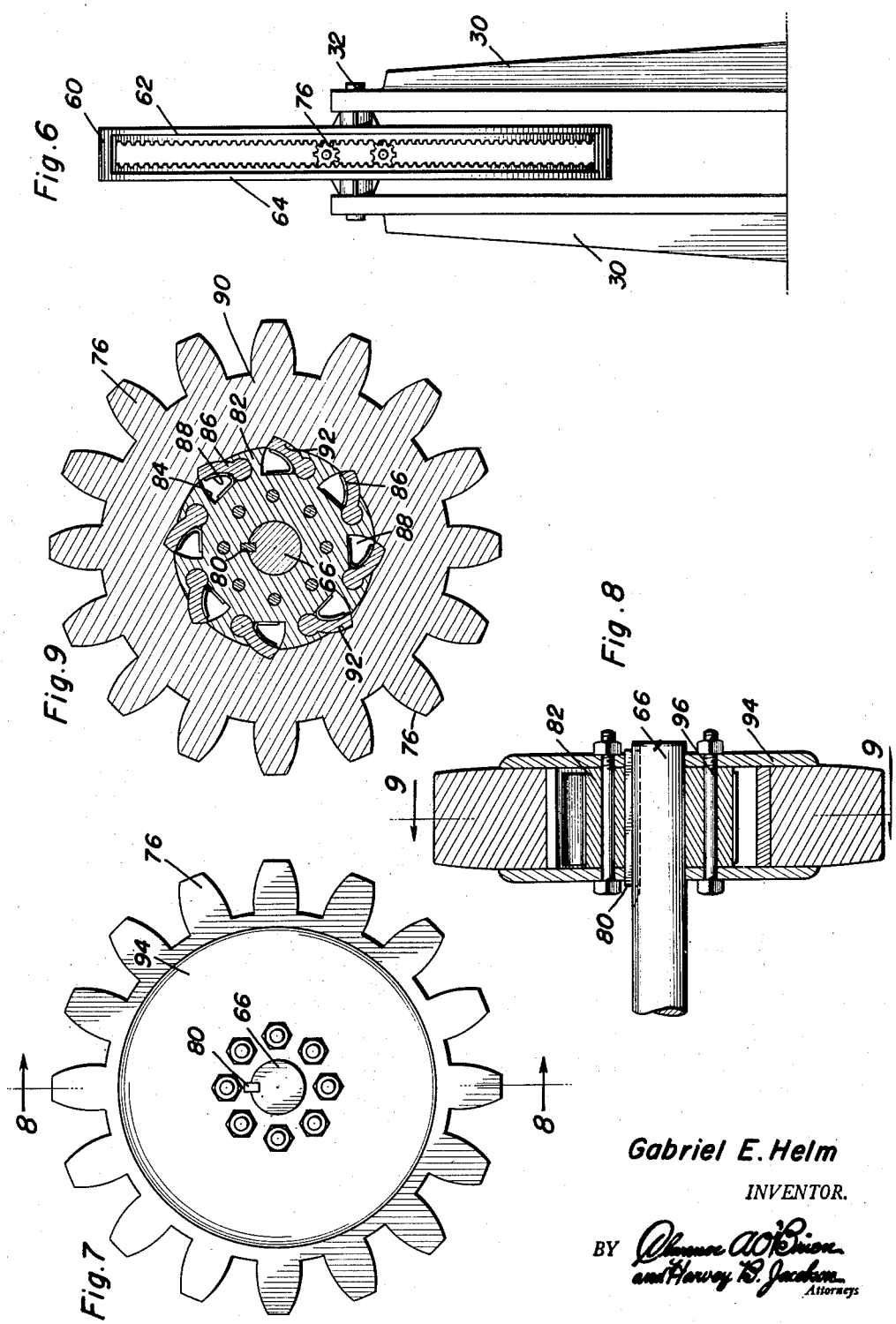
Gabriel E. Helm
INVENTOR.

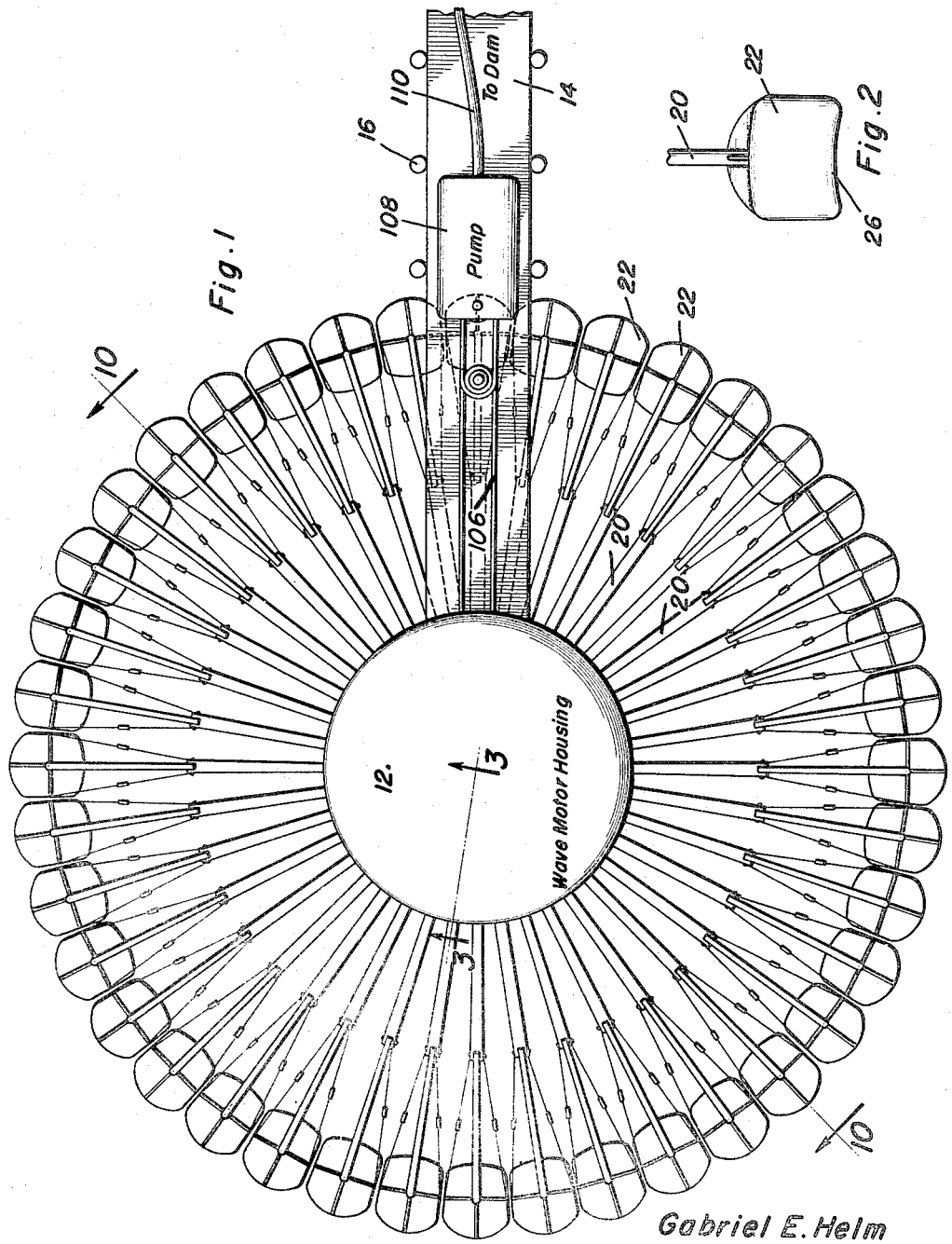

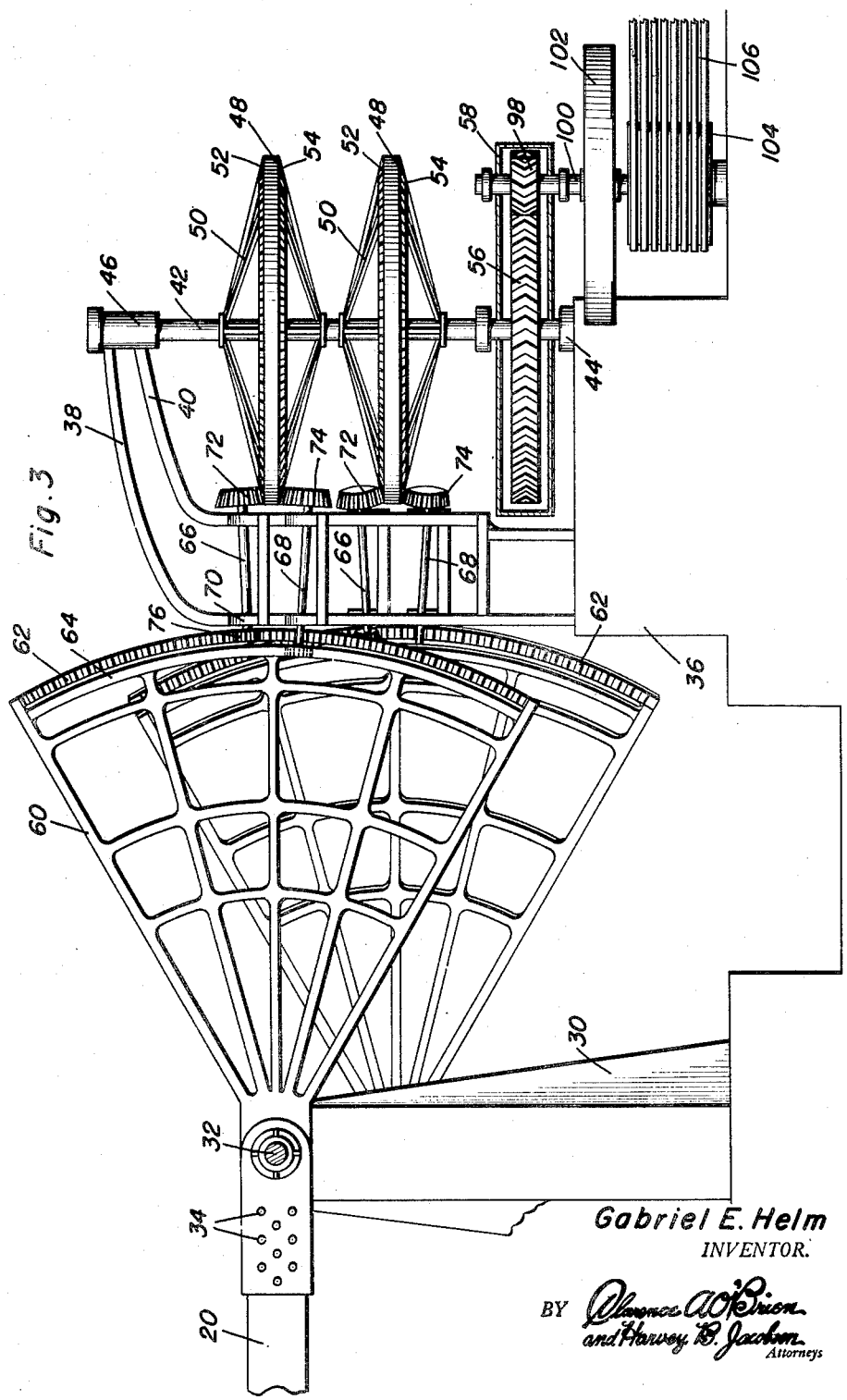

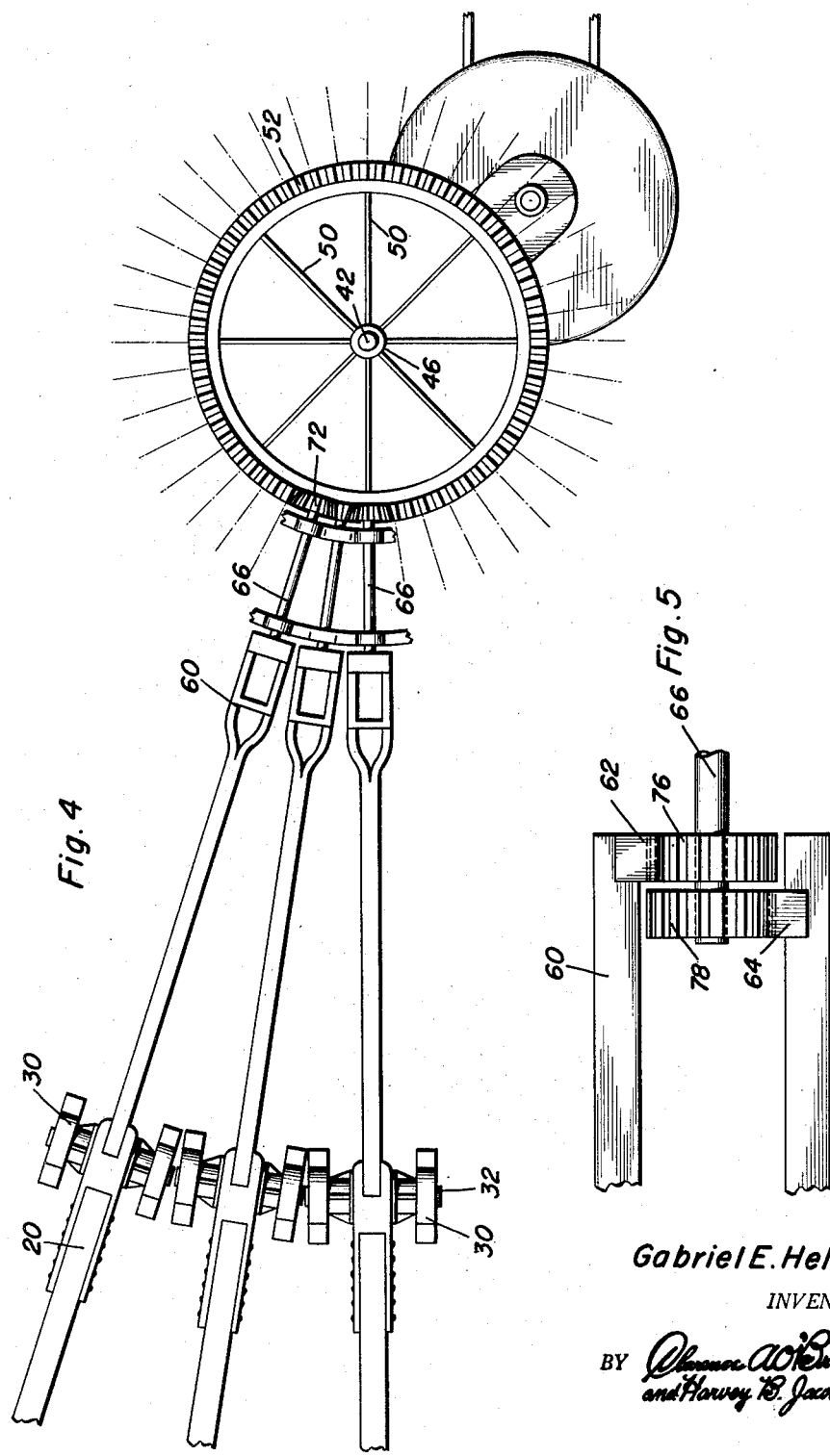

Aug. 7, 1956    G. E. HELM    2,757,899
WATER WAVE OPERATED POWER MECHANISM
Filed June 7, 1954    5 Sheets-Sheet 5
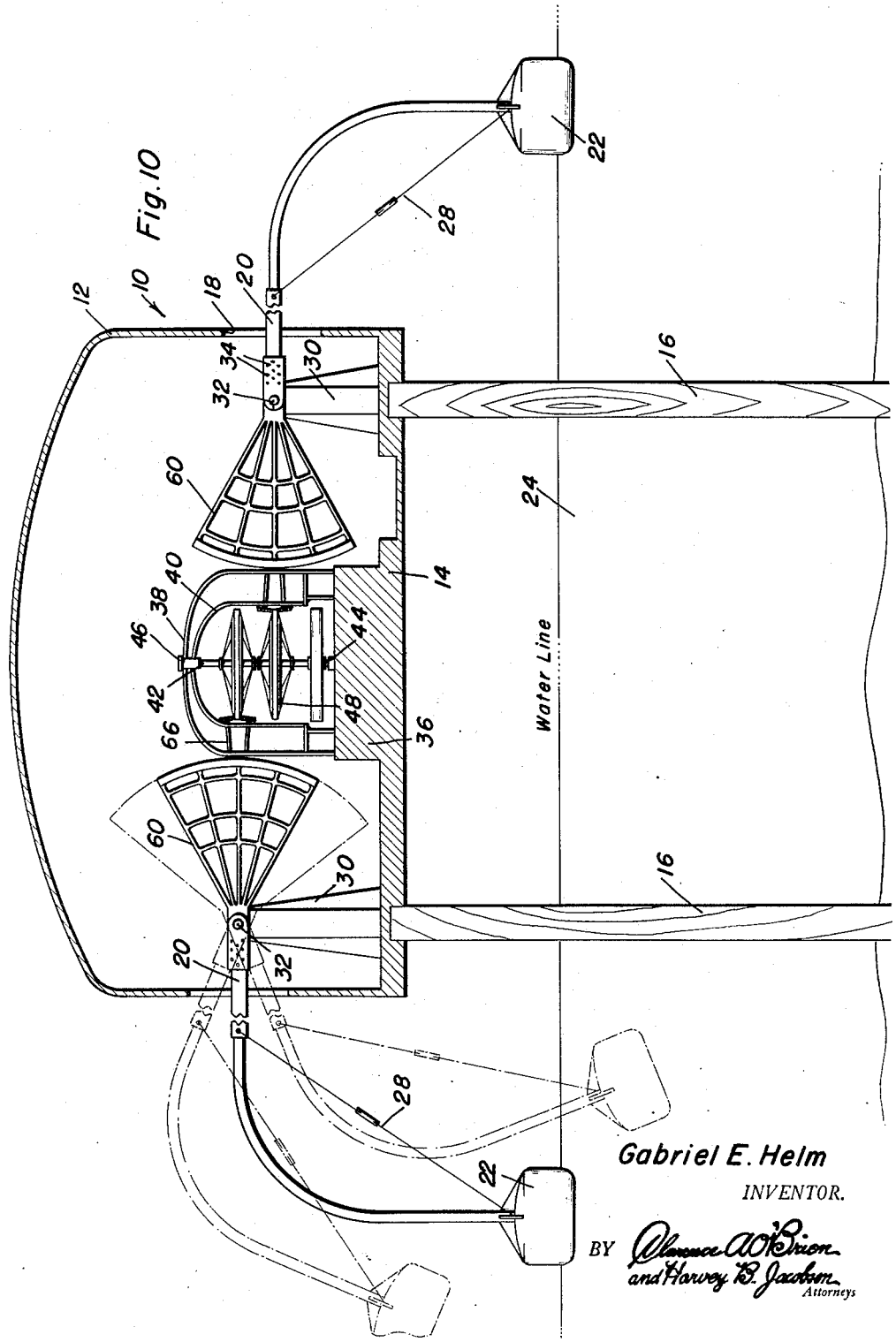
Gabriel E. Helm
INVENTOR.

United States Patent Office 2,757,899
Patented Aug. 7, 1956

2,757,899
WATER WAVE OPERATED POWER MECHANISM
Gabriel E. Helm, Eureka, Calif.
Application June 7, 1954, Serial No. 434,746
2 Claims. (Cl. 253—11)

This invention relates to a water wave operated power mechanism and more specifically provides a device for utilizing the normal wave motion usually found in unsheltered areas of the ocean for conversion of the energy in such wave motion to a suitable and readily used source of power.

An object of this invention is to provide a water wave operated power mechanism which is rugged in construction, simple in operation, dependable, versatile in utility, and adaptable for various installations, well adapted for its intended purposes and relatively inexpensive to manufacture and maintain.

Another object of this invention is to provide a water wave operated power mechanism having a plurality of floats and means for transmitting the up and down or reciprocatory motion of the float to rotary motion for transmitting the power of the float to a suitable device for storing the power.

Yet another object of this invention is to provide a water wave operated power mechanism for converting the oscillatory motion of a plurality of float members to a unidirectional motion wherein the power may be easily transmitted for utilization.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the water wave operated power mechanism of the present invention;

Figure 2 is a detailed view showing the shape of one of the plurality of float members;

Figure 3 is a detailed section taken substantially along section line 3—3 of Figure 1 showing the details of construction of the motion transmitting means;

Figure 4 is a top plan view of the construction of Figure 3;

Figure 5 is a detailed plan view showing the arcuate rack and pinion gears in meshing engagement therewith;

Figure 6 is an end section showing the relationship of the stub shaft and pinion gears in engagement with the rack;

Figure 7 is an end elevation of one of the pinion gears in engagement with the rack;

Figure 8 is a vertical section taken substantially along section line 8—8 of Figure 7 showing the details of construction of one of the ratchet pinion gears;

Figure 9 is a detailed vertical section taken substantially along section line 9—9 of Figure 8 showing the specific construction of the ratchet members for actuation of the pinion gears in a single direction; and Figure 10 is a vertical section taken substantially along section line 10—10 of Figure 1 showing the relationship of the pivotally mounted supporting arms with the float on the outer end thereof and the mechanism for transmitting the oscillatory motion of the float to the rotational movement of the centrally disposed drive shaft.

Referring now specifically to the drawings, it will be seen that the numeral 10 generally designates the water wave operated power mechanism of the present invention. The water wave operated power mechanism 10 of the present invention includes a circular housing 12 positioned at the end of a pier 14 and supported by suitable pilings 16 or the like. The housing 12 is positioned remotely from the shore of the ocean wherein the full effect of the wave motion in the open water will be utilized. The housing 12 includes a plurality of slots 18 for receiving a plurality of supporting arms 20 which carry enlarged float members 22 on one end thereof for floating in the water 24. As specifically shown in Figure 2, the floats 22 are provided with a generally concave bottom 26 and are relatively large in construction and extremely buoyant thereby moving under action of the waves. The supporting arm 20 is generally right angular in configuration and a bracing wire 28 extends from the float 22 to the horizontal portion of the arm 20 thereby bracing the supporting arm 20. The inner end of the supporting arm 20 is pivotally supported on an upright pedestal 30 by a suitable pivot pin 32. The portion of the arm 20 supporting the pivot pin 32 is secured to the extending portion of the arm by suitable fastening members 34.

As specifically illustrated in Figure 1, the supporting arm 20 and the float 22 are positioned adjacent each other about the housing 12 about a circle with the center of the housing being the center of the circle on which the floats 22 are disposed.

Referring now specifically to Figures 3 and 10, it will be seen that a base 36 is positioned in the central portion of the housing and a pair of cage members 38 and 40 are secured to the upper surface of the base 36 and the cages 38 and 40 form a support for an upright vertically disposed shaft 42 which rotates in a bearing 44 on the upper surface of the base 36 and a bearing 46 at the juncture of the frame portions of the cages 38 and 40. It will be seen that the cage 38 is an outer cage and the cage 40 is an inner cage with frame members running in parallel relation to each other. Keyed to and supported on the vertical shaft 42 is a pair of vertically spaced gears 48 which are substantially ring gears with suitable bracing 50 connecting the rims of the gears 48 to the shaft 42. Each of the gears 48 is provided with teeth 52 on the upper side and teeth 54 on the lower side thereby forming a double bevel gear for driving the vertical shaft 42. Adjacent the lower end of the vertical shaft 42 is secured a gear 56 of the herringbone type mounted in a suitable casing 58 for a purpose described hereinafter.

As specifically shown in Figure 3, each of the arms 20 terminates in a segmental member 60 having a pair of arcuate racks 62 having teeth thereon in facing relation to each other. The outer of the racks is designated by the numeral 62 and the inner of the racks is designated as the numeral 64 and the racks are generally parallel to each other with the outer rack 62 disposed in closely associated relation to the inner rack 64. In order to convert the oscillatory motion of the racks 62 and 64 to the rotational motion of the gear 48, a pair of stub axles 66 and 68 are journalled in suitable bearings 70 on the spaced frame members forming the cages 38 and 40. The inner ends of each of the axles 66 and 68 are provided with bevel gears 72 and 74 which engage the upper bevel 52 and the lower bevel 54 on the gear 48 respectively. The outer end of each of the axles 66 and 68 is provided with a pinion gear 76 and 78 for engaging the racks 62 and 64 respectively. It will be seen that the upper shaft 66 has the pinion gear 76 in meshing engagement with the outer rack 62 and the lower shaft or axle 68 is provided with a pinion gear 78 in engagement with the inner rack 64. Inasmuch as the bevel gears 72 and 74 are constantly in mesh with the bevel gear 48 and the pinion gears 76 and 78 are in continuous mesh with the racks 62 and 64 and means for permitting one of the pinions 76 to idle while the other pinion is driving is necessary.

Referring now specifically to Figures 7-9, it will be seen that a detailed showing of one of the pinions 76 or 78 is shown and it will be understood that an identical structure is used in both of the pinions. The pinion 76 is secured to the upper shaft 66 by a suitable key 80. The key 80 secures a central hub 82 to the shaft for rotation therewith and the hub 82 includes a plurality of arcuate recesses 84 having a ratchet pawl 86 pivotally mounted therein. A U-shaped spring member 88 is positioned between the inner surface of each of the ratchet pawls 86 and the inner surface of the recess 84 thereby continuously urging the ratchet pawls 86 outwardly against the rim 90 of the gear 76. The rim or outer portion of the gear 76 is provided with recesses or notches 92 for engagement with the ratchet members 86 in one direction of rotation of the shaft 66. When the shaft 66 rotates in the other direction, the spring 88 will be compressed thereby permitting the pawls 86 to ride out of the recesses 92 and permitting the shaft 66 to rotate freely of the outer portion of the gear 76. Suitable circular plates 94 are positioned on each side of the gear 76 and are secured thereto by suitable fastening bolts 96 which secure the circular plates to each side of the gear 76 thereby retaining the various elements between the hub 82 and the rim 90 of the gear 76. It will be understood that as the outer rack 62 moves upwardly and the float 22 moves downwardly, the gear 76 will be rotated thereby rotating the shaft 66, bevel gear 72 and bevel gear 48 and causing the bevel gear 74 and shaft 68 to rotate in an opposite direction. Due to the ratchet construction of the pinion 78, the shaft 68 rotates freely of the pinion 78 thereby permitting the pinion 78 to idle. Obviously, when the racks 62 and 64 move downwardly, the above process is reversed.

The herringbone gear 56 drives a smaller herringbone gear 98 secured to a shaft 100 which has a fly wheel 102 mounted thereon and a pulley 104 with a plurality of grooves for receiving a plurality of drive belts 106 thereby driving the belts 106 upon rotation of the drive shaft 42 and the herringbone gear 56. As specifically shown in Figure 1, a pump 108 is driven by the belt 106 wherein water may be pumped through a suitable pipe line 110 to a reservoir for storage for future use. It will be understood that the device may be connected to any suitable power conversion mechanism however it is usually desirable to store the energy in periods of great wave movement for use when the waves are relatively small or of less frequency.

In operation, the floats 22 are moved by the water waves thereby imparting motion to the racks 62 and 64 wherein such oscillatory motion is transmitted to rotational motion of the vertical shaft 42 thereby driving the pump 108 or by any other suitable power mechanism. Further, suitable mechanism may be associated with the device for rendering the floats inoperative, that is, the floats 22 may be stopped at their uppermost position for repair of the machinery or for any other desirable purpose. The theoretical horsepower available from a device of this nature may be developed for different brackets of average wave heights. The average wave heights have been established for the various areas of the ocean and these average heights may be utilized in computing the theoretical gross horsepower available from the source of power that has yet been unharnessed. These calculations are based on the length and speed of the average wave and for an average wave height of 3 feet, the theoretical gross horsepower is 314 horsepower. Obviously, suitable computations may be made in order to determine the theoretical horsepower for various wave heights.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A water wave operated power mechanism comprising a housing, supporting means for said housing, said housing being positioned in open water having wave movements, a plurality of floats positioned in the water and having mounting arms pivotally secured to said housing, said arms terminating within said housing, and means for transmitting the oscillatory motion of the inner ends of said arms into unidirectional rotation for connection to a power mechanism, said motion transmitting means including a vertically disposed shaft, an enlarged gear secured to said shaft, said gear having beveled side portions with gear teeth around the periphery thereof, a pair of facing arcuate rack members secured to said arms, a pinion gear in engagement with each of said racks, a stub shaft driven by each of said pinion gears, a bevel gear on each of said stub shafts, said stub shafts and bevel gears being vertically spaced and aligned for meshing engagement with opposite sides of said enlarged gear, and clutch means connected with each of said pinion gears for rotation of each of said stub shafts in a single direction with one bevel gear being driven in one direction and the other bevel gear being driven in the other direction thereby imparting power to said enlarged gear in a single direction.

2. The structure as defined in claim 1 wherein said clutch means includes a hub secured to the stub shaft, a gear rim surrounding said hub, a plurality of notches in the inner periphery of the rim, a plurality of spring urged pawls pivotally mounted on said hub for engaging said notches thereby rotating the stub shaft when the gear rim moves in one direction and permitting the shaft to rotate in relation to the gear rim when the gear rim moves in the other direction.

References Cited in the file of this patent

UNITED STATES PATENTS

| 468,668 | Lowe | Feb. 9, 1892 |
|---|---|---|
| 559,107 | Rose | Apr. 28, 1896 |
| 691,697 | Baker | Jan. 21, 1902 |
| 778,855 | Goldman | Jan. 3, 1905 |
| 1,369,593 | Wilkin | Feb. 22, 1921 |
| 1,385,083 | McCulley | July 19, 1921 |
| 1,645,458 | Scott | Oct. 11, 1927 |

FOREIGN PATENTS

| 104,157 | Great Britain | Jan. 31, 1918 |
|---|---|---|
| 250,209 | Great Britain | Nov. 18, 1926 |
| 481,537 | France | Sept. 22, 1916 |
| 557,813 | France | May 12, 1923 |